(12) United States Patent
Alizadeh-Shabdiz et al.

(10) Patent No.: US 7,769,396 B2
(45) Date of Patent: *Aug. 3, 2010

(54) LOCATION-BASED SERVICES THAT CHOOSE LOCATION ALGORITHMS BASED ON NUMBER OF DETECTED ACCESS POINTS WITHIN RANGE OF USER DEVICE

(75) Inventors: Farshid Alizadeh-Shabdiz, Wayland, MA (US); Russel K. Jones, Roswell, GA (US); Edward J. Morgan, Needham, MA (US); Michael G. Shean, Boston, MA (US)

(73) Assignee: Skyhook Wireless, Inc., Boston, MA (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/950,178

(22) Filed: Dec. 4, 2007

(65) Prior Publication Data

US 2008/0132170 A1    Jun. 5, 2008

Related U.S. Application Data

(63) Continuation of application No. 11/261,988, filed on Oct. 28, 2005, now Pat. No. 7,305,245.

(60) Provisional application No. 60/623,108, filed on Oct. 29, 2004.

(51) Int. Cl.
*H04Q 7/20* (2006.01)
(52) U.S. Cl. .............. 455/456.6; 455/456.5; 455/456.1; 370/328; 342/357.02
(58) Field of Classification Search .............. 455/456.6, 455/456.5, 456.1; 370/328; 342/357.02
See application file for complete search history.

(56) References Cited

U.S. PATENT DOCUMENTS 4,415,771 A    11/1983    Martinez
(Continued)

FOREIGN PATENT DOCUMENTS

| WO | WO-2006/096416 | 9/2006 |
| WO | WO-2006/110181 | 10/2006 |
| WO | WO-2007/081356 | 7/2007 |

OTHER PUBLICATIONS

"Delta Encoding", Wikipedia, retrieved from http://en.wikipedia.org/wiki/Delta_encoding, 2006.

(Continued)

*Primary Examiner*—Danh C Le
(74) *Attorney, Agent, or Firm*—Wilmer Cutler Pickering Hale and Dorr LLP

(57) ABSTRACT

A location beacon database and server, method of building location beacon database, and location based service using same. Wi-Fi access points are located in a target geographical area to build a reference database of locations of Wi-Fi access points. At least one vehicle is deployed including at least one scanning device having a GPS device and a Wi-Fi radio device and including a Wi-Fi antenna system. The target area is traversed in a programmatic route to avoid arterial bias. The programmatic route includes substantially all drivable streets in the target geographical area and solves an Eulerian cycle problem of a graph represented by said drivable streets. While traversing the target area, periodically receive the GPS coordinates of the GPS device. While traversing the target area, detecting Wi-Fi signals from Wi-Fi access points in range of the Wi-Fi device and recording identity information of the detected Wi-Fi access point in conjunction with GPS location information of the vehicle when the detection of the Wi-Fi access point was made. The location information is used to reverse triangulate the position of the detected Wi-Fi access point; and the position of the detected access point is recorded in a reference database.

15 Claims, 11 Drawing Sheets

U.S. PATENT DOCUMENTS

| | | | |
|---|---|---|---|
| 4,991,176 | A | 2/1991 | Dahbura et al. |
| 5,315,636 | A | 5/1994 | Patel |
| 5,564,121 | A | 10/1996 | Chow et al. |
| 5,940,825 | A | 8/1999 | Castelli et al. |
| 6,134,448 | A | 10/2000 | Shoji et al. |
| 6,272,405 | B1 | 8/2001 | Kubota et al. |
| 6,438,491 | B1 | 8/2002 | Farmer |
| 6,678,611 | B2 | 1/2004 | Khavakh et al. |
| 6,799,049 | B1 | 9/2004 | Zellner et al. |
| 6,862,524 | B1 | 3/2005 | Nagda et al. |
| 6,888,811 | B2 | 5/2005 | Eaton et al. |
| 6,915,128 | B1 | 7/2005 | Oh |
| 6,956,527 | B2 | 10/2005 | Rogers et al. |
| 6,978,023 | B2 | 12/2005 | Dacosta |
| 7,042,391 | B2 * | 5/2006 | Meunier et al. ........ 342/357.02 |
| 7,123,928 | B2 | 10/2006 | Moeglein et al. |
| 7,167,715 | B2 | 1/2007 | Stanforth |
| 7,167,716 | B2 | 1/2007 | Kim et al. |
| 7,206,294 | B2 | 4/2007 | Garahi et al. |
| 7,254,405 | B2 | 8/2007 | Lin et al. |
| 7,271,765 | B2 | 9/2007 | Stilp et al. |
| 7,305,245 | B2 | 12/2007 | Alizadeh-Shabdiz et al. |
| 7,323,991 | B1 | 1/2008 | Eckert et al. |
| 7,397,424 | B2 | 7/2008 | Houri |
| 7,403,762 | B2 | 7/2008 | Morgan et al. |
| 7,414,988 | B2 | 8/2008 | Jones et al. |
| 7,417,961 | B2 | 8/2008 | Lau |
| 7,433,694 | B2 | 10/2008 | Morgan et al. |
| 7,471,954 | B2 | 12/2008 | Brachet et al. |
| 7,474,897 | B2 | 1/2009 | Morgan et al. |
| 7,493,127 | B2 | 2/2009 | Morgan et al. |
| 7,502,620 | B2 | 3/2009 | Morgan et al. |
| 7,515,578 | B2 | 4/2009 | Alizadeh-Shabdiz et al. |
| 7,551,579 | B2 | 6/2009 | Alizadeh-Shabdiz et al. |
| 7,551,929 | B2 | 6/2009 | Alizadeh-Shabdiz et al. |
| 2002/0184331 | A1 | 12/2002 | Blight et al. |
| 2003/0069024 | A1 | 4/2003 | Kennedy |
| 2003/0087647 | A1 | 5/2003 | Hurst |
| 2003/0114206 | A1 | 6/2003 | Timothy et al. |
| 2003/0125045 | A1 | 7/2003 | Riley et al. |
| 2003/0146835 | A1 | 8/2003 | Carter |
| 2003/0225893 | A1 | 12/2003 | Roese et al. |
| 2004/0019679 | A1 | 1/2004 | E et al. |
| 2004/0039520 | A1 | 2/2004 | Khavakh et al. |
| 2004/0058640 | A1 | 3/2004 | Root et al. |
| 2004/0087317 | A1 | 5/2004 | Caci |
| 2004/0124977 | A1 | 7/2004 | Biffar |
| 2004/0193367 | A1 | 9/2004 | Cline |
| 2004/0205234 | A1 | 10/2004 | Barrack et al. |
| 2004/0263388 | A1 * | 12/2004 | Krumm et al. ............... 342/451 |
| 2005/0020266 | A1 | 1/2005 | Backes et al. |
| 2005/0037775 | A1 | 2/2005 | Moeglein et al. |
| 2005/0055374 | A1 | 3/2005 | Sato |
| 2005/0108306 | A1 | 5/2005 | Martizano Catalasan |
| 2005/0136845 | A1 * | 6/2005 | Masuoka et al. ......... 455/67.14 |
| 2005/0164710 | A1 | 7/2005 | Beuck |
| 2005/0192024 | A1 | 9/2005 | Sheynblat |
| 2005/0227711 | A1 | 10/2005 | Orwant et al. |
| 2005/0251326 | A1 * | 11/2005 | Reeves ....................... 701/200 |
| 2006/0002326 | A1 * | 1/2006 | Vesuna ....................... 370/328 |
| 2006/0009235 | A1 * | 1/2006 | Sheynblat et al. ........ 455/456.1 |
| 2006/0046709 | A1 | 3/2006 | Krumm et al. |
| 2006/0058958 | A1 | 3/2006 | Galbreath et al. |
| 2006/0061476 | A1 * | 3/2006 | Patil et al. ................. 340/572.4 |
| 2006/0078122 | A1 | 4/2006 | Dacosta |
| 2006/0092015 | A1 | 5/2006 | Agrawal et al. |
| 2006/0095348 | A1 | 5/2006 | Jones et al. |
| 2006/0095349 | A1 | 5/2006 | Morgan et al. |
| 2006/0106850 | A1 | 5/2006 | Morgan et al. |
| 2006/0128397 | A1 | 6/2006 | Choti et al. |
| 2006/0197704 | A1 | 9/2006 | Luzzatto et al. |
| 2006/0200843 | A1 | 9/2006 | Morgan et al. |
| 2006/0217131 | A1 | 9/2006 | Alizadeh-Shabdiz et al. |
| 2006/0240840 | A1 | 10/2006 | Morgan et al. |
| 2006/0270421 | A1 | 11/2006 | Phillips et al. |
| 2007/0004427 | A1 | 1/2007 | Morgan et al. |
| 2007/0004428 | A1 | 1/2007 | Morgan et al. |
| 2007/0097511 | A1 | 5/2007 | Das et al. |
| 2007/0126635 | A1 | 6/2007 | Houri |
| 2007/0150516 | A1 | 6/2007 | Morgan et al. |
| 2007/0178911 | A1 | 8/2007 | Baumeister et al. |
| 2007/0184846 | A1 | 8/2007 | Horton et al. |
| 2007/0202888 | A1 | 8/2007 | Brachet et al. |
| 2007/0210961 | A1 | 9/2007 | Romijn |
| 2007/0232892 | A1 | 10/2007 | Hirota |
| 2007/0258408 | A1 | 11/2007 | Alizadeh-Shabdiz et al. |
| 2007/0258409 | A1 | 11/2007 | Alizadeh-Shabdiz et al. |
| 2007/0258420 | A1 | 11/2007 | Alizadeh-Shabdiz et al. |
| 2007/0258421 | A1 | 11/2007 | Alizadeh-Shabdiz et al. |
| 2007/0259624 | A1 | 11/2007 | Alizadeh-Shabdiz et al. |
| 2008/0008117 | A1 | 1/2008 | Alizadeh-Shabdiz |
| 2008/0008118 | A1 | 1/2008 | Alizadeh-Shabdiz |
| 2008/0008119 | A1 | 1/2008 | Alizadeh-Shabdiz |
| 2008/0008120 | A1 | 1/2008 | Alizadeh-Shabdiz |
| 2008/0008121 | A1 | 1/2008 | Alizadeh-Shabdiz |
| 2008/0033646 | A1 | 2/2008 | Morgan et al. |
| 2008/0045234 | A1 | 2/2008 | Reed |
| 2008/0108371 | A1 | 5/2008 | Alizadeh-Shabdiz et al. |
| 2008/0132170 | A1 | 6/2008 | Alizadeh-Shabdiz et al. |
| 2008/0133124 | A1 | 6/2008 | Sarkeshik |
| 2008/0139217 | A1 | 6/2008 | Alizadeh-Shabdiz et al. |
| 2008/0139219 | A1 | 6/2008 | Boeiro et al. |
| 2008/0176583 | A1 | 7/2008 | Brachet et al. |
| 2008/0248741 | A1 | 10/2008 | Alizadeh-Shabdiz |
| 2008/0248808 | A1 | 10/2008 | Alizadeh-Shabdiz |
| 2009/0075672 | A1 | 3/2009 | Jones et al. |
| 2009/0149197 | A1 | 6/2009 | Morgan et al. |
| 2009/0154371 | A1 | 6/2009 | Alizadeh-Shabdiz et al. |
| 2009/0175189 | A1 | 7/2009 | Alizadeh-Shabdiz et al. |
| 2009/0252138 | A1 | 10/2009 | Alizadeh-Shabdiz et al. |
| 2009/0303112 | A1 | 12/2009 | Alizadeh-Shabdiz |
| 2009/0303113 | A1 | 12/2009 | Alizadeh-Shabdiz |
| 2009/0303114 | A1 | 12/2009 | Alizadeh-Shabdiz |
| 2009/0303115 | A1 | 12/2009 | Alizadeh-Shabdiz |
| 2009/0303119 | A1 | 12/2009 | Alizadeh-Shabdiz |
| 2009/0303120 | A1 | 12/2009 | Alizadeh-Shabdiz |
| 2009/0303121 | A1 | 12/2009 | Alizadeh-Shabdiz |
| 2009/0310585 | A1 | 12/2009 | Alizadeh-Shabdiz |
| 2009/0312035 | A1 | 12/2009 | Alizadeh-Shabdiz |
| 2009/0312036 | A1 | 12/2009 | Alizadeh-Shabdiz |

OTHER PUBLICATIONS

"Huffman Coding", Wikipedia, retrieved from http://en.wikipedia.org/wiki/Huffman_coding, 2006.

"Terminal Equipment and Protocols for Telematic Services: Information Technology-Digital Compression and Coding of Continuous-Tome Still Images—Requirements and Guidelines," International Telecommunication Union, Sep. 1992.

Griswold et al., "ActiveCampus—Sustaining Educational Communities through Mobile Technology." UCSD CSE Technical Report #CS200-0714, 2002.

Hazas, M., et al., "Location-Aware Computing Comes of Age," IEEE, vol. 37, Feb. 2004.

Hellebrandt, M., et al., "Estimating Position and Velocity of Mobile in a Cellular Radio Network," IEEE Transactions on Vehicular Technology, vol. 46, No. 1, Feb. 1997.

Kawabata, K., "Estimating Velocity Using Diversity Reception," IEEE, 1994.

Kim, M., et al., "Risks of using AP locations discovered through war driving," Lecture Notes in Computer Science, vol. 3968, 2006.

Kirsner, S., "One more way to find yourself," The Boston Globe, May 23, 2005, Retrieved from www.boston.com.

Krumm, J., et al., "LOCADIO: Inferring Motion and Location from Wi-Fi Signal Strengths," First Annual International Conference on Mobile and Ubiquitous Systems: Networking and Services, Aug. 2004.

Kwan, M., "Graphic Programming Using Odd or Even Points," Chinese Math. 1, 1962.

LaMarca, A., et al., "Place Lab: Device Positioning Using Radio Beacons in the Wild," Intel Corporation, 2004.

Muthukrishnan, K., et al., "Towards Smart Surroundings: Enabling Techniques and Technologies for Localization," Lecture Notes in Computer Science, vol. 3479, May 2005.

International Search Report, International Application No. PCT/US05/39208, mailed Jan. 29, 2008. (3 pages).

Written Opinion of the International Searching Authority, International Application No. PCT/US05/39208, mailed Jan. 29, 2008. (3 pages).

U.S. Appl. No. 11/625,450, Alizadeh-Shabdiz.

LaMarca, A., et al., "Self-Mapping in 802.11 Location Systems," Intel Corporation, 2005.

Algorithms, "Eulerian Cycle/Chinese Postman," published on Jun. 2, 1997, http://www2.toki.or.id/book/AlgDesignManual/BOOK/BOOK4/NODE165.HTM, 3 pages.

Weisstein, Eric W., "Chinese Postman Problem," Mathworld—A Wolfman Web Resource, retrieved from http://mathworld.wolfram.com/ChinesePostmanProblem.html, 2010, 1 page.

* cited by examiner

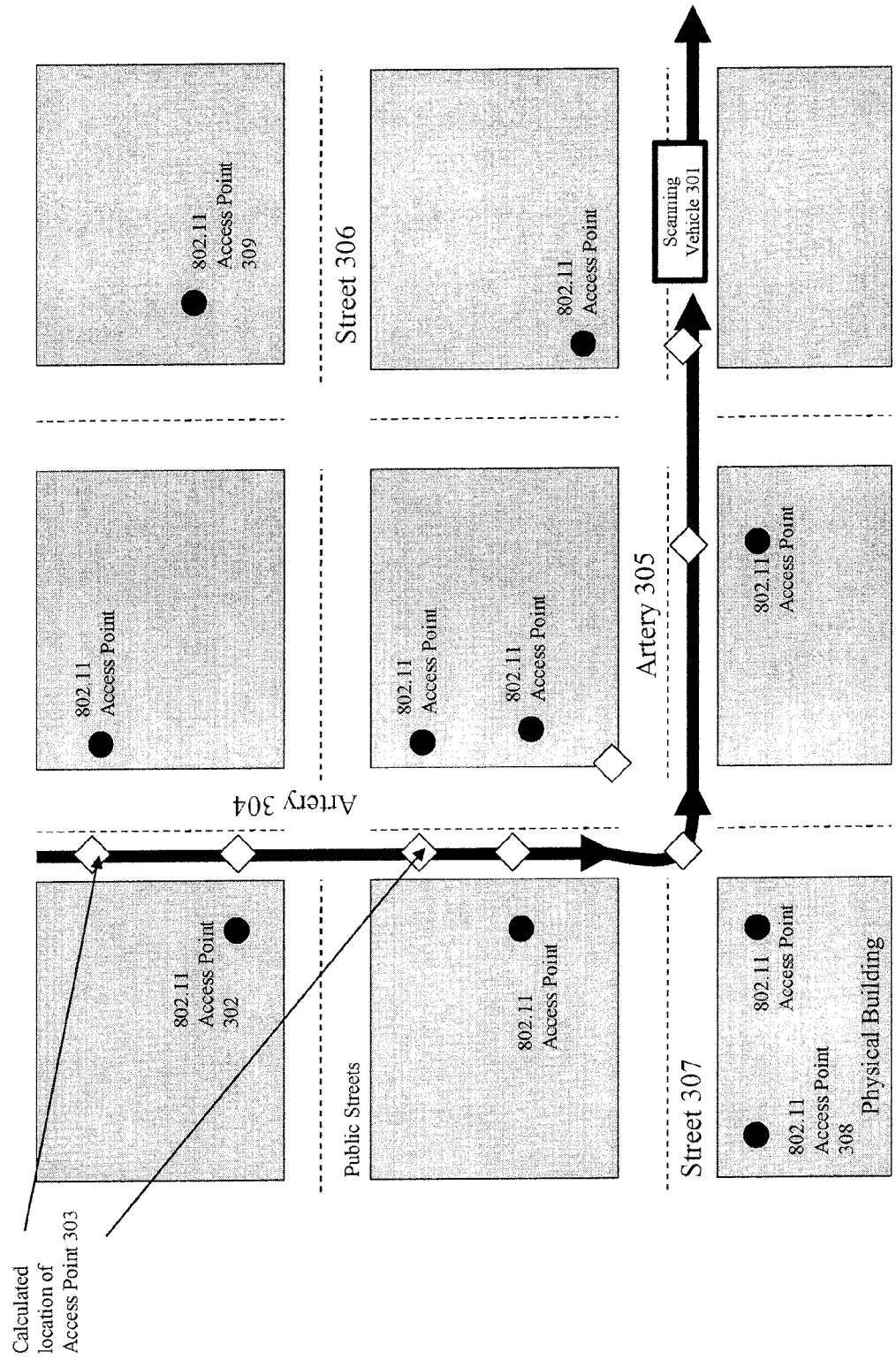
Figure 3: Example scanning scenario showing arterial bias

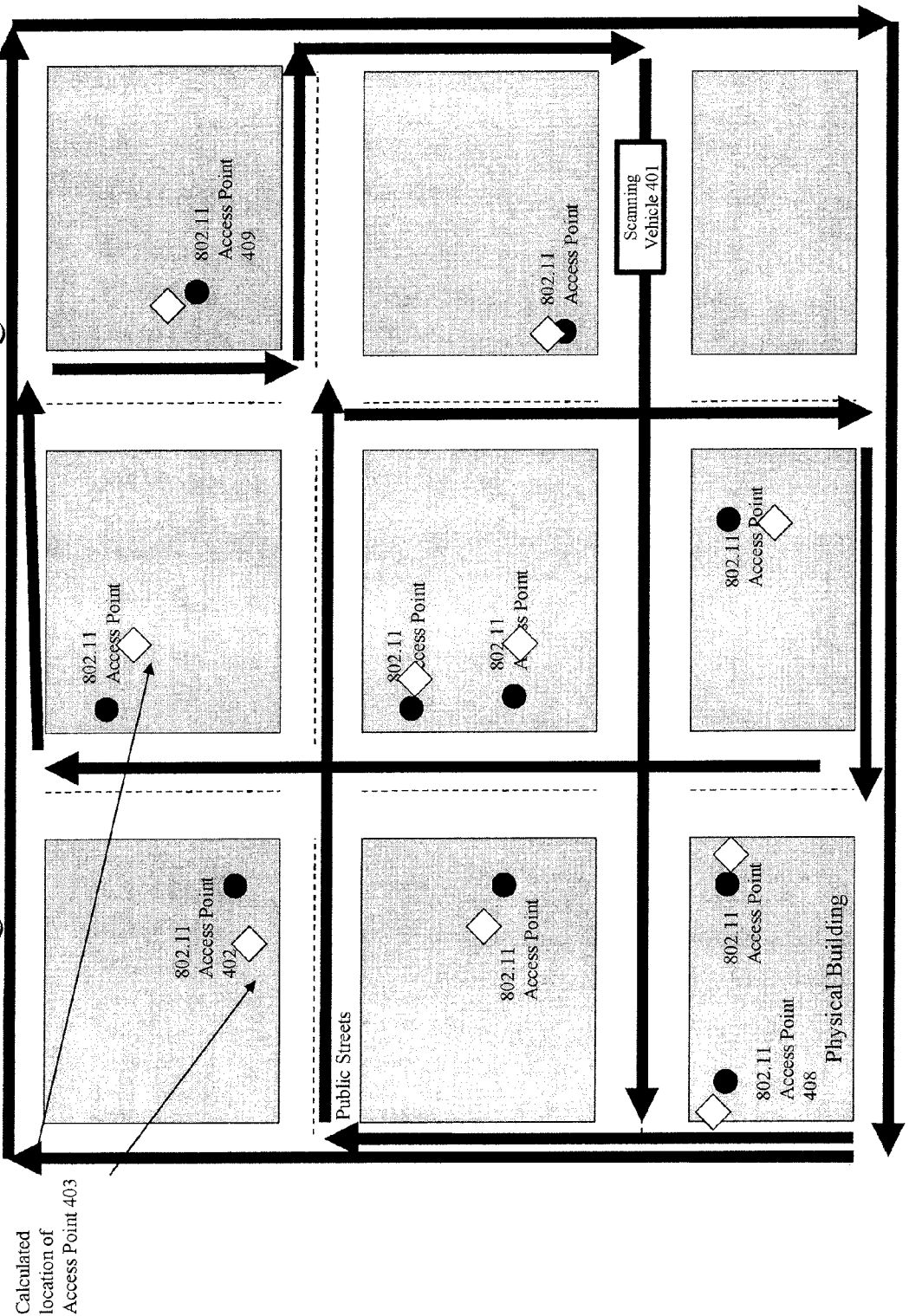

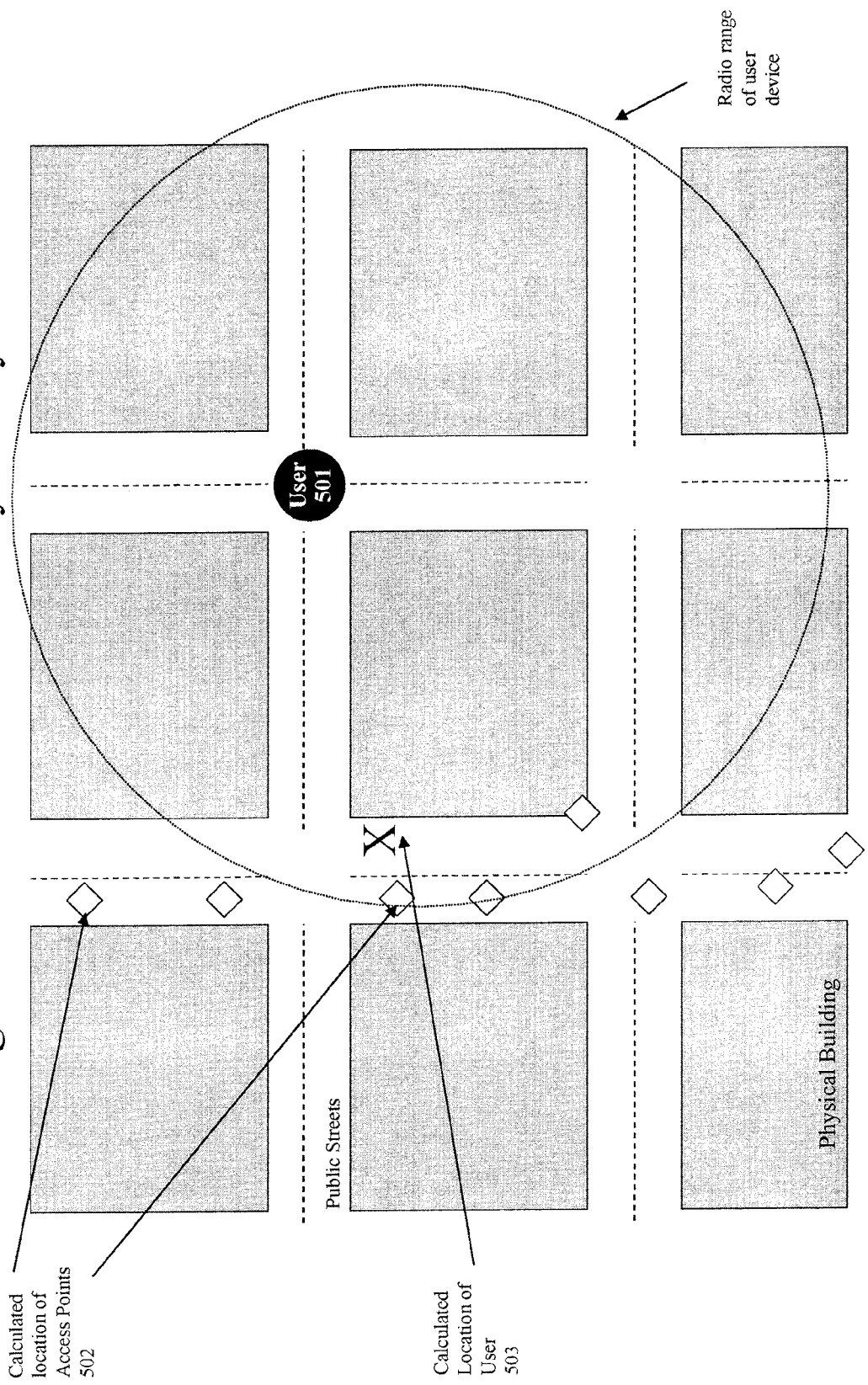
Figure 5: Lack of Reference Symmetry

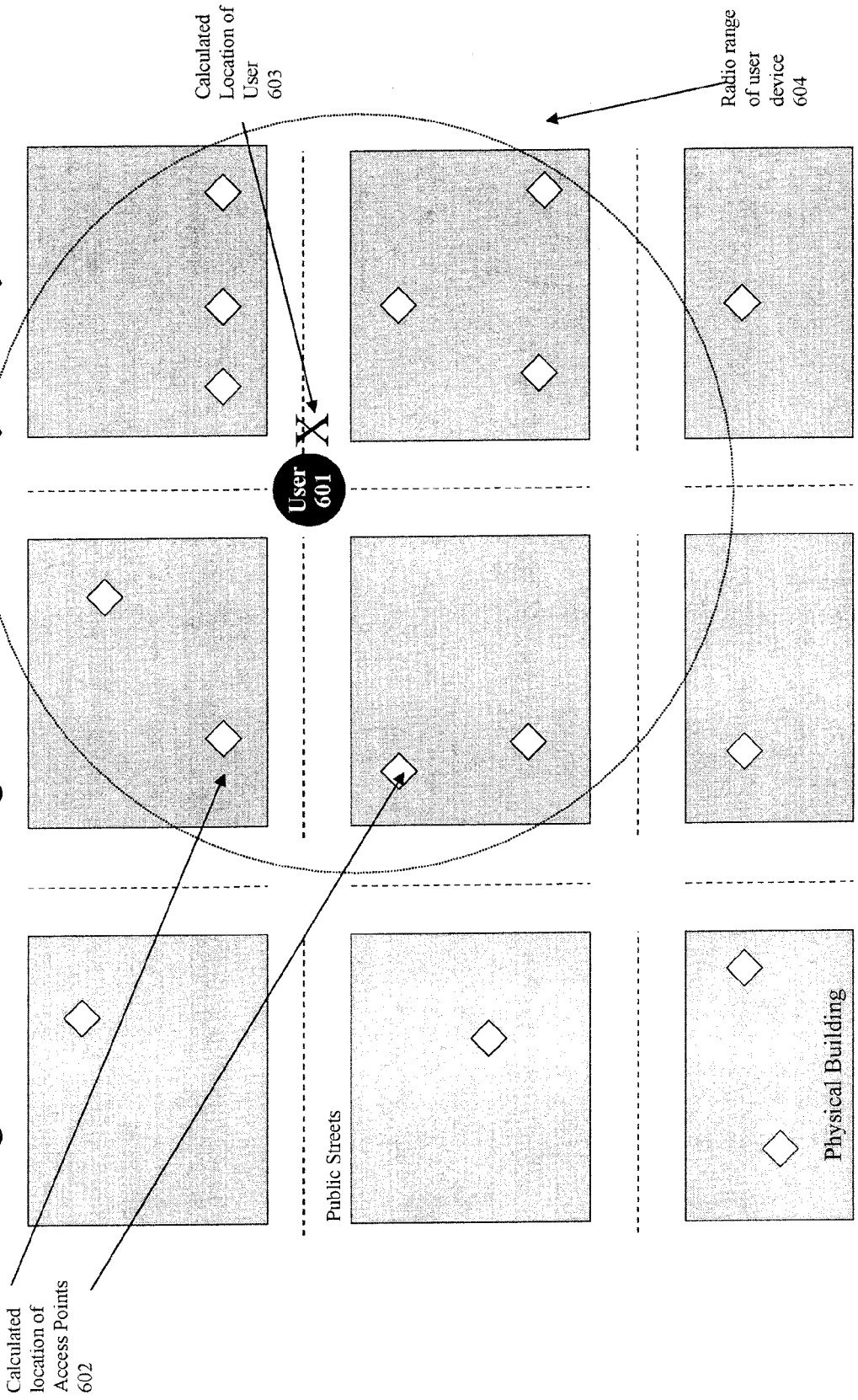
Figure 6: Positioning with Reference Symmetry

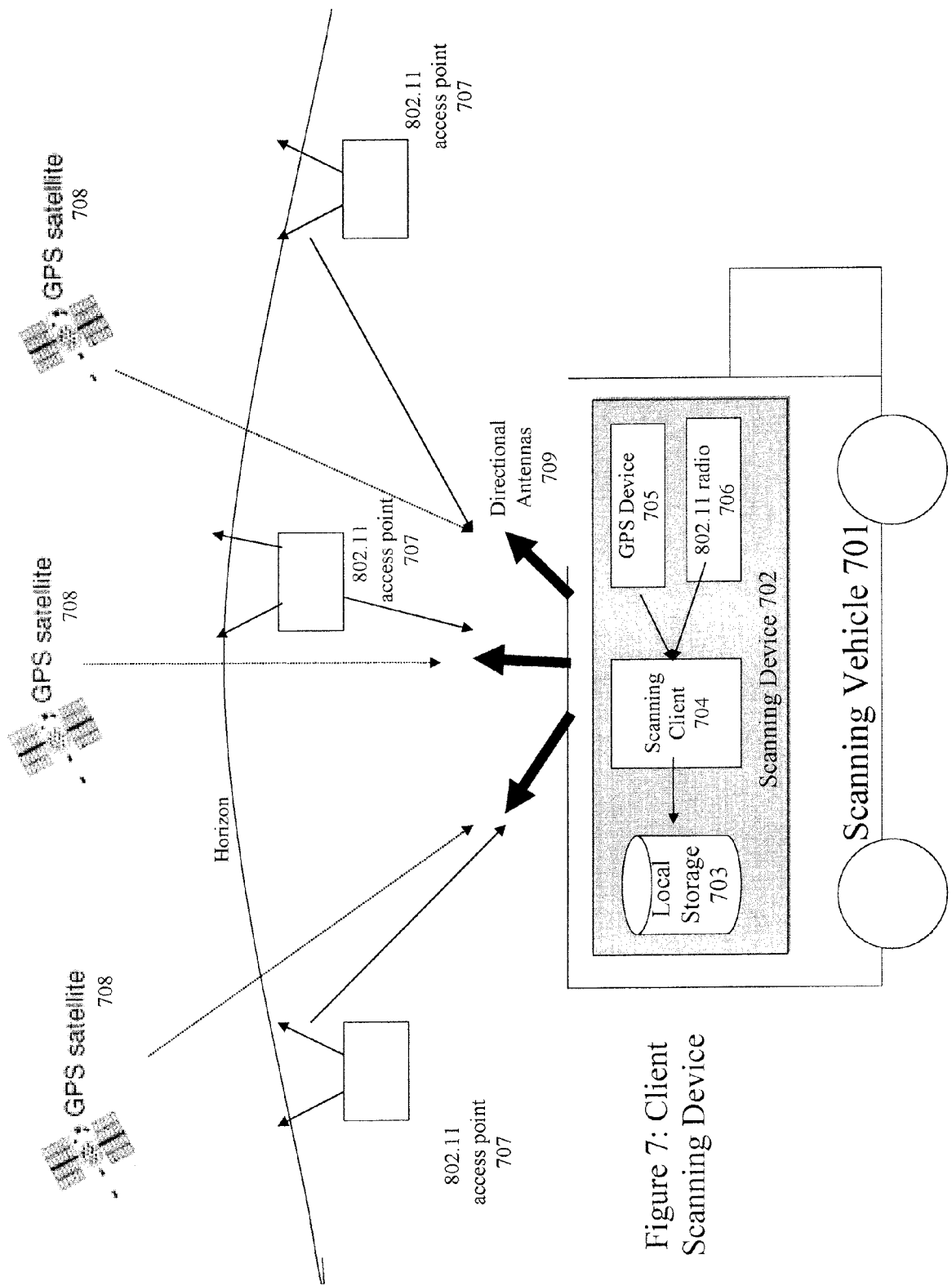
Figure 7: Client Scanning Device

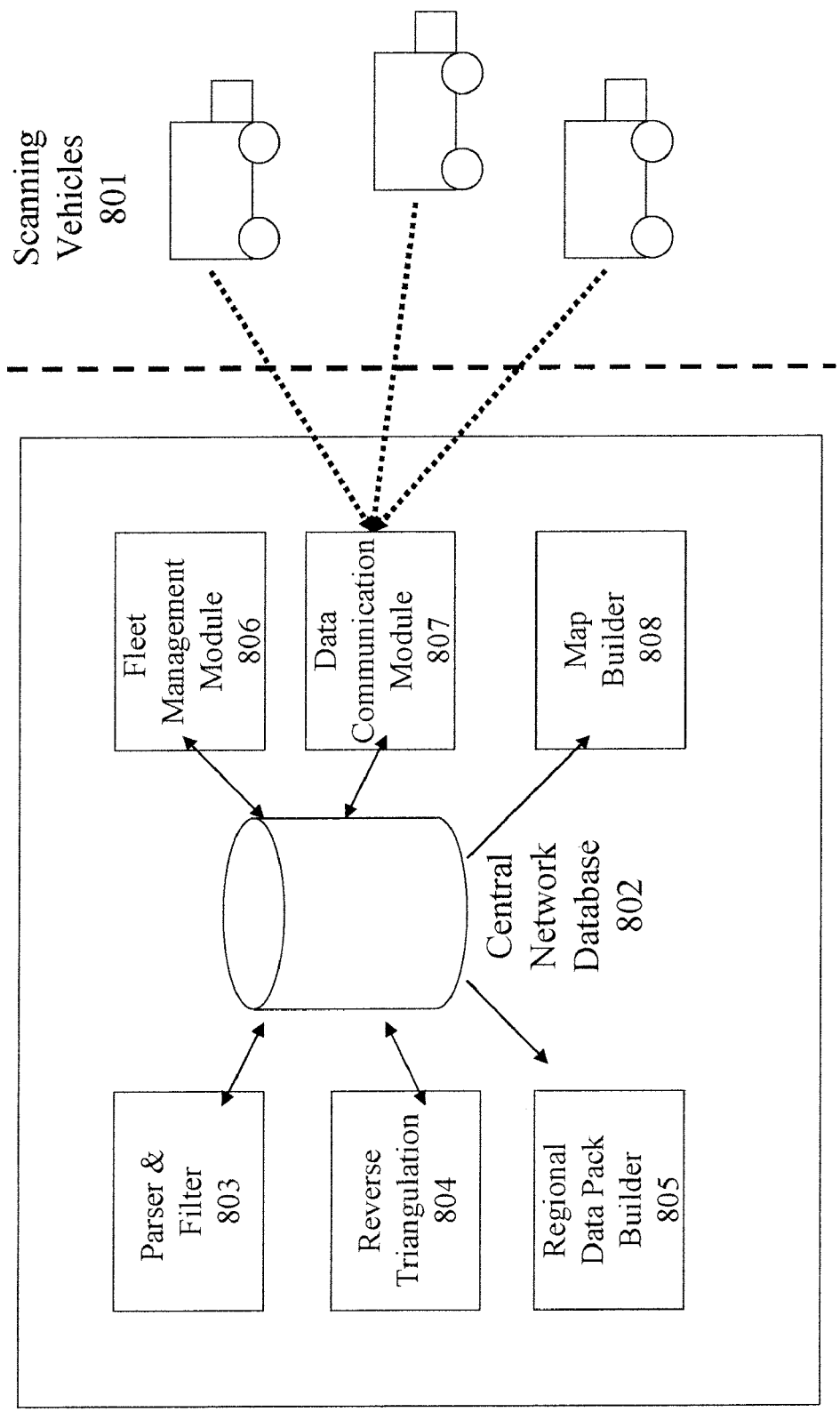

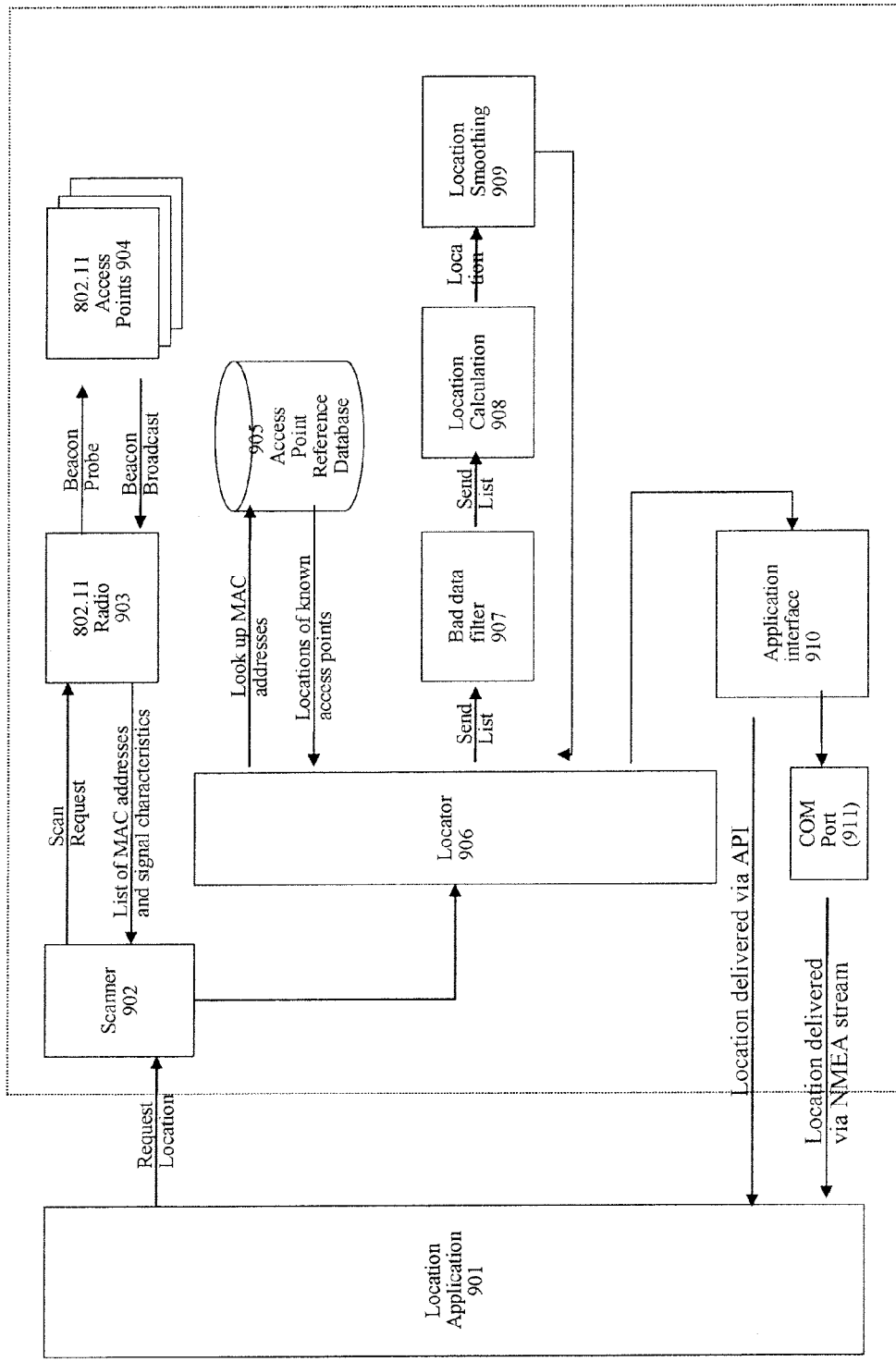
Figure 9: Positioning Software

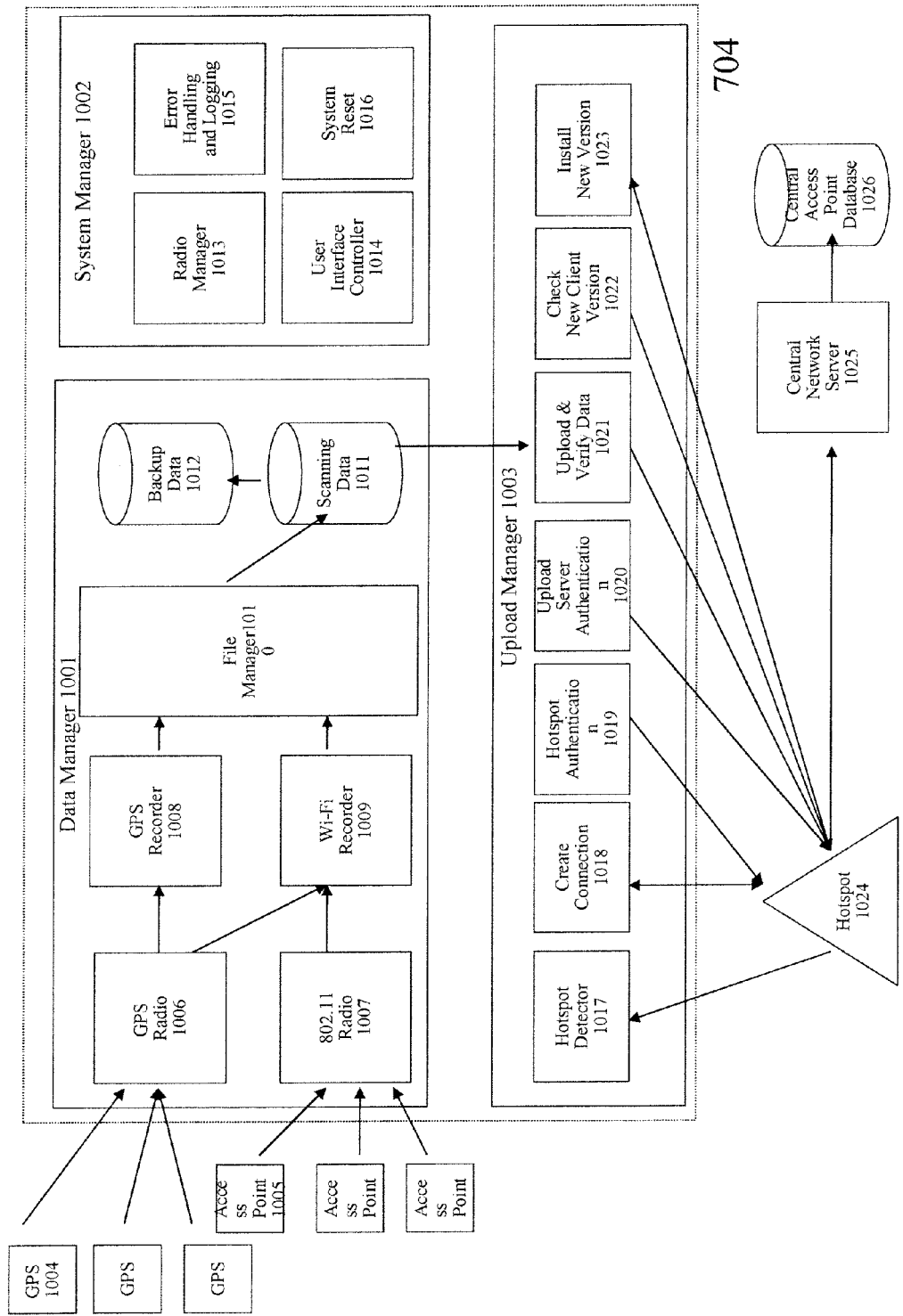
Figure 10: Scanning Client

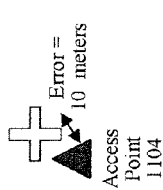
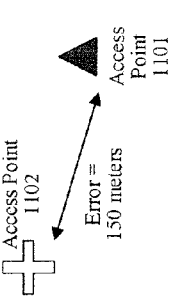
Figure 11: comparison of scanning models

LOCATION-BASED SERVICES THAT CHOOSE LOCATION ALGORITHMS BASED ON NUMBER OF DETECTED ACCESS POINTS WITHIN RANGE OF USER DEVICE

CROSS-REFERENCE TO RELATED APPLICATIONS

This application is a continuation of prior U.S. patent application Ser. No. 11/261,988, now U.S. Pat. No. 7,305,245, filed on Oct. 28, 2005, entitled Location-Based Services That Choose Location Algorithms Based On Number Of Detected Access Points Within Range Of User Device, which claims the benefit under 35 U.S.C. §119(e) of U.S. Provisional Patent Application No. 60/623,108, filed on Oct. 29, 2004, entitled Wireless Data Scanning Network for Building Location Beacon Database, both of which are herein incorporated by reference in their entirety.

This application is related to the following U.S. patent applications:

U.S. patent application Ser. No. 11/261,848, filed Oct. 28, 2005, entitled Location Beacon Database;

U.S. patent application Ser. No. 11/261,898, filed Oct. 28, 2005, entitled Server for Updating Location Beacon Database;

U.S. patent application Ser. No. 11/261,987, filed Oct. 28, 2005, entitled Method and System for Building a Location Beacon Database; and U.S. patent application Ser. No. 11/950,242, filed Dec. 4, 2007, entitled Location-Based Services That Choose Location Algorithms Based On Number Of Detected Wireless Signal Stations Within Range Of User Device.

BACKGROUND

1. Field of the Invention

The invention generally related to location-base services and, more specifically, to methods and systems of determining locations of Wi-Fi access points and using such information to locate a Wi-Fi-enabled device.

2. Discussion of Related Art

In recent years the number of mobile computing devices has increased dramatically creating the need for more advanced mobile and wireless services. Mobile email, walkie-talkie services, multi-player gaming and call following are examples of how new applications are emerging on mobile devices. In addition, users are beginning to demand/seek applications that not only utilize their current location but also share that location information with others. Parents wish to keep track of their children, supervisors need to track the location of the company's delivery vehicles, and a business traveler looks to find the nearest pharmacy to pick up a prescription. All of these examples require the individual to know their own current location or that of someone else. To date, we all rely on asking for directions, calling someone to ask their whereabouts or having workers check-in from time to time with their position.

Location-based services are an emerging area of mobile applications that leverages the ability of new devices to calculate their current geographic position and report that to a user or to a service. Some examples of these services include local weather, traffic updates, driving directions, child trackers, buddy finders and urban concierge services. These new location sensitive devices rely on a variety of technologies that all use the same general concept. Using radio signals coming from known reference points, these devices can mathematically calculate the user's position relative to these reference points. Each of these approaches has its strengths and weaknesses based on the radio technology and the positioning algorithms they employ.

The Global Positioning System (GPS) operated by the US Government leverages dozens of orbiting satellites as reference points. These satellites broadcast radio signals that are picked up by GPS receivers. The receivers measure the time it took for that signal to reach to the receiver. After receiving signals from three or more GPS satellites the receiver can triangulate its position on the globe. For the system to work effectively, the radio signals must reach the received with little or no interference. Weather, buildings or structures and foliage can cause interference because the receivers require a clear line-of-sight to three or more satellites. Interference can also be caused by a phenomenon known as multi-path. The radio signals from the satellites bounce off physical structures causing multiple signals from the same satellite to reach a receiver at different times. Since the receiver's calculation is based on the time the signal took to reach the receiver, multi-path signals confuse the receiver and cause substantial errors.

Cell tower triangulation is another method used by wireless and cellular carriers to determine a user or device's location. The wireless network and the handheld device communicate with each other to share signal information that the network can use to calculate the location of the device. This approach was originally seen as a superior model to GPS since these signals do not require direct line of site and can penetrate buildings better. Unfortunately these approaches have proven to be suboptimal due to the heterogeneous nature of the cellular tower hardware along with the issues of multi-path signals and the lack of uniformity in the positioning of cellular towers.

Assisted GPS is a newer model that combines both GPS and cellular tower techniques to produce a more accurate and reliable location calculation for mobile users. In this model, the wireless network attempts to help GPS improve its signal reception by transmitting information about the clock offsets of the GPS satellites and the general location of the user based on the location of the connected cell tower. These techniques can help GPS receivers deal with weaker signals that one experiences indoors and helps the receiver obtain a 'fix' on the closest satellites quicker providing a faster "first reading". These systems have been plagued by slow response times and poor accuracy—greater than 100 meters in downtown areas.

There have been some more recent alternative models developed to try and address the known issues with GPS, A-GPS and cell tower positioning. One of them, known as TV-GPS, utilizes signals from television broadcast towers. (See, e.g., Muthukrishnan, Maria Lijding, Paul Having a, Towards Smart Surroundings: Enabling Techniques and Technologies for Localization, Lecture Notes in Computer Science, Volume 3479, Jan 2Hazas, M., Scott, J., Krumm, J.: Location-Aware Computing Comes of Age. IEEE Computer, 37(2):95-97, February 2004 005, Pa005, Pages 350-362.) The concept relies on the fact that most metropolitan areas have 3 or more TV broadcast towers. A proprietary hardware chip receives TV signals from these various towers and uses the known positions of these towers as reference points. The challenges facing this model are the cost of the new hardware receiver and the limitations of using such a small set of reference points. For example, if a user is outside the perimeter of towers, the system has a difficult time providing reasonable accuracy. The classic example is a user along the shoreline. Since there are no TV towers out in the ocean, there is no way to provide reference symmetry among the reference points resulting in a calculated positioning well inland of the user.

Microsoft Corporation and Intel Corporation (via a research group known as PlaceLab) have deployed a Wi-Fi Location system using the access point locations acquired from amateur scanners (known as "wardrivers") who submit their Wi-Fi scan data to public community web sites. (See, e.g., LaMarca, A., et. al., Place Lab: Device Positioning Using Radio Beacons in the Wild.) Examples include WiGLE, Wi-FiMaps.com, Netstumbler.com and NodeDB. Both Microsoft and Intel have developed their own client software that utilizes this public wardriving data as reference locations. Because individuals voluntarily supply the data the systems suffer a number of performance and reliability problems. First, the data across the databases are not contemporaneous; some of the data is new while other portions are 3-4 years old. The age of the access point location is important since over time access points can be moved or taken offline. Second, the data is acquired using a variety of hardware and software configurations. Every 802.11 radio and antenna has different signal reception characteristics affecting the representation of the strength of the signal. Each scanning software implementation scans for Wi-Fi signals in different ways during different time intervals. Third, the user-supplied data suffers from arterial bias. Because the data is self-reported by individuals who are not following designed scanning routes, the data tends to aggregate around heavily traffic areas. Arterial bias causes a resulting location pull towards main arteries regardless of where the user is currently located causing substantial accuracy errors. Fourth, these databases include the calculated position of scanned access points rather than the raw scanning data obtained by the 802.11 hardware. Each of these databases calculates the access point location differently and each with a rudimentary weighted average formula. The result is that many access points are indicated as being located far from their actual locations including some access points being incorrectly indicated as if they were located in bodies of water.

There have been a number of commercial offerings of Wi-Fi location systems targeted at indoor positioning. (See, e.g., Kavitha Muthukrishnan, Maria Lijding, Paul Having a, Towards Smart Surroundings: Enabling Techniques and Technologies for Localization, Lecture Notes in Computer Science, Volume 3479, Jan 2Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for these indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario.

There are numerous 802.11 location scanning clients available that record the presence of 802.11 signals along with a GPS location reading. These software applications are operated manually and produce a log file of the readings. Examples of these applications are Netstumber, Kismet and Wi-FiFoFum. Some hobbyists use these applications to mark the locations of 802.11 access point signals they detect and share them with each other. The management of this data and the sharing of the information is all done manually. These application do not perform any calculation as to the physical location of the access point, they merely mark the location from which the access point was detected.

Performance and reliability of the underlying positioning system are the key drivers to the successful deployment of any location based service. Performance refers to the accuracy levels that the system achieves for that given use case. Reliability refers to the percentage of time that the desired performance levels are achieved.

|  | Performance | Reliability |
|---|---|---|
| Local Search/Advertising | <100 meters | 85% of the time |
| E911 | <150 meters | 95% of the time |
| Turn-by-turn driving directions | 10-20 meters | 95% of the time |
| Gaming | <50 meters | 90% of the time |
| Friend finders | <500 meters | 80% of the time |
| Fleet management | <10 meters | 95% of the time |
| Indoor asset tracking | <3 meters | 95% of the time |

SUMMARY

The invention provides a location beacon database and server, method of building location beacon database, and location based service using same.

Under another aspect of the invention, a user-device having a Wi-Fi radio may be located. A reference database of calculated locations of Wi-Fi access points in a target area is provided. In response to a user application request to determine a location of a user-device having a Wi-Fi radio, the Wi-Fi device is triggered to transmit a request to all Wi-Fi access points within range of the Wi-Fi device. Messages are received from the Wi-Fi access points within range of the Wi-Fi device, each message identifying the Wi-Fi access point sending the message. The signal strength of the messages received by the Wi-Fi access points is calculated. The reference database is accessed to obtain the calculated locations for the identified Wi-Fi access points. Based on the number of Wi-Fi access points identified via received messages, choosing a corresponding location-determination algorithm from a plurality of location-determination algorithms, said chosen algorithm being suited for the number of identified Wi-Fi access points. The calculated locations for the identified Wi-Fi access points and the signal strengths of said received messages and the chosen location-determination algorithm are used to determine the location of the user-device.

Under another aspect of the invention, the calculated locations for the identified Wi-Fi access points are filtered to determine if the corresponding Wi-Fi access points have moved since the time the information about the Wi-Fi access points was included in the reference database.

Under another aspect of the invention, the plurality of location-determination algorithms includes a simple signal strength weighted average model.

Under another aspect of the invention, the plurality of location-determination algorithms includes a nearest neighbor model.

Under another aspect of the invention, the plurality of location-determination algorithms includes a triangulation technique.

Under another aspect of the invention, the plurality of location-determination algorithms includes an adaptive smoothing technique based on the device velocity.

Under another aspect of the invention, the choice of location-determination algorithm is further based on the user application making the location request.

BRIEF DESCRIPTION OF DRAWINGS

In the drawing,

FIG. 3 depicts an example of a scanning scenario to illustrate the problem of arterial bias in data collection;

FIG. 4 depicts an example using a programmatic route for a scanning vehicle according to certain embodiments of the invention;

FIG. 5 depicts an example scenario to illustrate the problem of lack of reference symmetry of Wi-Fi access points in locating a user device;

FIG. 6 depicts an example scenario to illustrate reference symmetry of Wi-Fi access points in locating a user device;

FIG. 7 depicts scanning vehicles including scanning devices according to certain embodiments of the invention;

FIG. 8 depicts a central network server including a central database of Wi-Fi access points according to certain embodiments of the invention;

FIG. 9 depicts an exemplary architecture of positioning software according to certain embodiments of the invention;

FIG. 10 depicts an exemplary architecture of a scanning client according to certain embodiments of the invention; and FIG. 11 compares and contrasts the effects of a random scanning model with one using a model from the Chinese postman routing algorithm.

DETAILED DESCRIPTION

Preferred embodiments of the present invention provide a system and a methodology for gathering reference location data to enable a commercial positioning system using public and private 802.11 access points. Preferably, the data is gathered in a programmatic way to fully explore and cover the streets of a target region. The programmatic approach identifies as many Wi-Fi access points as possible. By gathering location information about more access points, preferred embodiments not only provide a larger collection of location information about access points, but the location information for each access point may be calculated with more precision. Subsequently this larger set of more precise data may be used by location services to more precisely locate a user device utilizing preferred embodiments of the invention. Certain embodiments use techniques to avoid erroneous data in determining the Wi-Fi positions and use newly-discovered position information to improve the quality of previously gathered and determined position information. Certain embodiments use location-determination algorithms based on the context of the user device at the time the user requests a location. For example, the location-determination algorithm will be based on the number of Wi-Fi access points identified or detected when a location request is made, or based on the application making the request.

Figure 1:
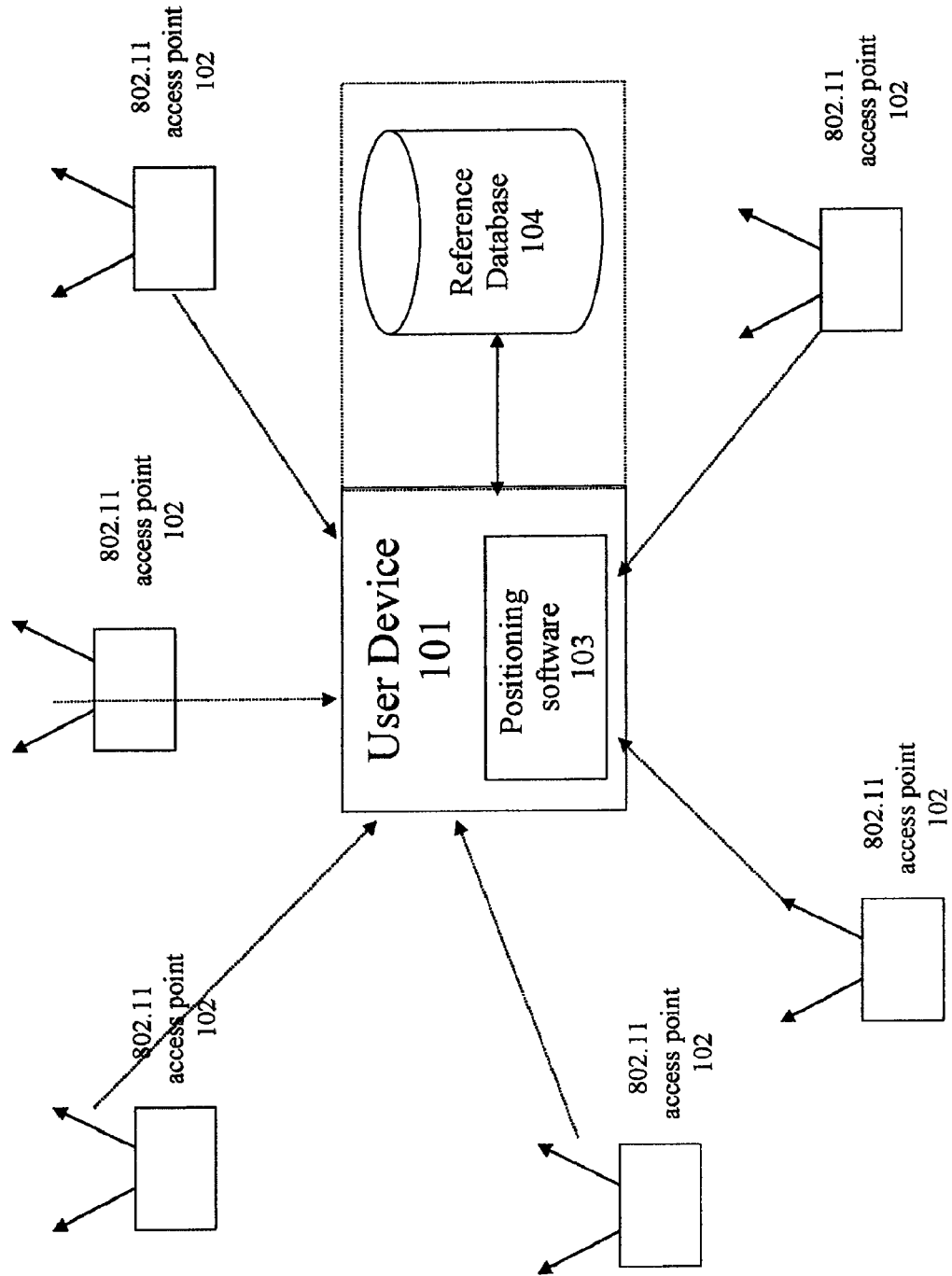
FIG. 1 depicts certain embodiments of a Wi-Fi positioning system.

FIG. 1 depicts a portion of a preferred embodiment of a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations or power profile of all the access points the gathering system has collected. The power profile is a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

The positioning software is described in greater detail with reference to FIG. 9, which depict exemplary components of positioning software 103. Typically there is an application or service that utilizes location readings to provide some value to an end user (example, driving directions). This location application makes a request of the positioning software for the location of the device at that particular moment. That request initiates the scanner [902], which makes a "scan request" to the 802.11 radio [903] on the device. The 802.11 radio sends out a probe request to all 802.11 access points [904] within range. According to the 802.11 protocol, those access points in receipt of a probe request will transmit a broadcast beacon containing information about the access point. That beacon includes the MAC address of the device, the network name, the precise version of the protocol that it supports and its security configuration along with information about how to connect to the device. The 802.11 radio collects this information from each access point that responds, calculates the signal strength of each access point and sends that back to the scanner.

The scanner passes this array of access points to the Locator [906] which checks the MAC addresses of each observed access point against the Access Point Reference Database [905]. This database can either be located on the device or remotely over a network connection. The Access Point Reference Database returns the location data for each of the observed access points that are known to the system. The Locator passes this collection of location information along with the signal characteristics returned from each access point to the Bad Data Filter [907]. This filter applies a number of comparison tests against each access point to determine if any of the access points have moved since they were added to the access point database. After removing bad data records, the Filter sends the remaining access points to the Location Calculation component [908]. Using the reference data from the access point database and the signal strength readings from the Scanner, the Location Calculation component computes the location of the device at that moment. Before that location data is sent back to the Locator, it is processed by the Smoothing engine [909] which averages a past series of location readings to remove any erratic readings from the previous calculation. The adjusted location data is then sent back to the Locator.

The calculated location readings produced by the Locator are communicated to these location-based applications [901] through the Application Interface [910] which includes an application programming interface (API) or via a virtual GPS capability [911]. GPS receivers communicate their location readings using proprietary messages or using the location standard like the one developed by the National Marine Electronics Association (NMEA). Connecting into the device using a standard interface such as a COM port on the machine retrieves the messages. Certain embodiments of the invention include a virtual GPS capability that allows any GPS compatible application to communicate with this new positioning system without have to alter the communication model or messages.

The location calculations are produced using a series of positioning algorithms intended to turn noisy data flows into reliable and steady location readings. The client software compares the list of observed access points along with their calculated signal strengths to weight the location of user to determine precise location of the device user. A variety of techniques are employed including simple signal strength weighted average models, nearest neighbor models combined with triangulation techniques and adaptive smoothing based on device velocity. Different algorithms perform better under different scenarios and tend to be used together in hybrid deployments to product the most accurate final readings. Preferred embodiments of the invention can use a number of positioning algorithms. The decision of which algorithm to use is driven by the number of access points observed and the user case application using it. The filtering models differ from traditional positioning systems since traditional systems rely on known reference points that never move. In the model of preferred embodiments, this assumption of fixed locations of access points is not made; the access points are not owned by the positioning system so they may move or be taken offline. The filtering techniques assume that some access points may no longer be located in the same place and could cause a bad location calculation. So the filtering algorithms attempt to isolate the access points that have moved since their position was recorded. The filters are dynamic and change based on the number of access points observed at that moment. The smoothing algorithms include simple position averaging as well as advanced bayesian logic including Kalman filters. The velocity algorithms calculate device speed by estimating the Doppler effect from the signal strength observations of each access point.

Gathering of Scan Data to Build Reference Database

Figure 2:
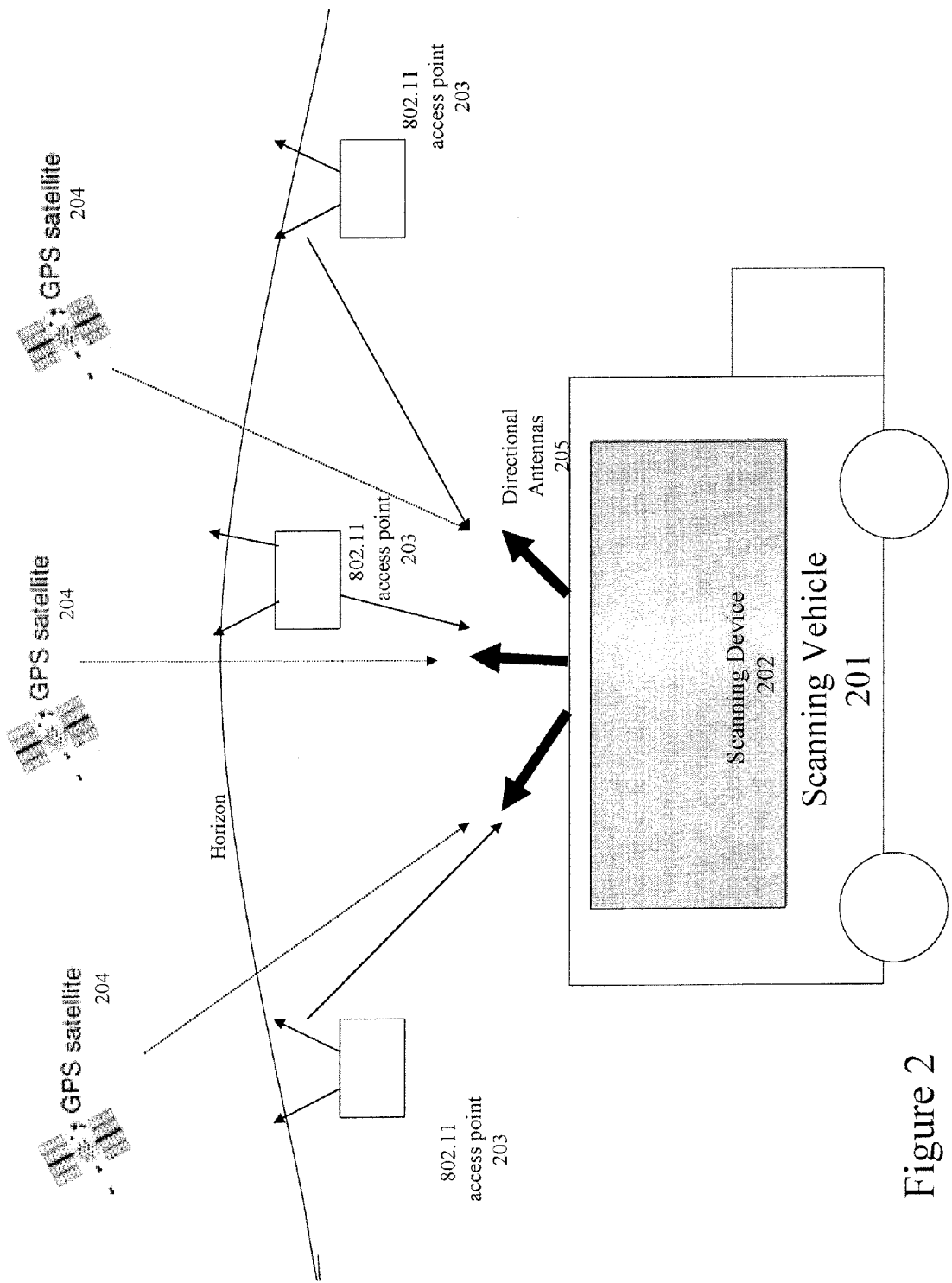
FIG. 2 depicts scanning vehicles including scanning devices according to certain embodiments of the invention.

FIG. 2 depicts the components used to gather location information for the various access points. A large fleet of vehicles [201] is deployed to build the reference database (104 of FIG. 1) for the positioning system. These vehicles 201 follow a programmatic route through target scan areas to gather data in the most optimal fashion producing the highest quality data. The target scan areas typically represent a large metropolitan area including every single drivable street in 15-20 mile radius. These vehicles are equipped with scanning devices [202] designed to record the locations and characteristics of 802.11 signals while traversing the coverage area. The scanning devices track the location of the scanning vehicle every second using signal from GPS satellites [204]. The scanning device also tracks the presence of any 802.11 access point within range and records the radio characteristics of that access point signal along with the GPS location of the scanning vehicle. The quality of the data collected is greatly affected by the scanning methodology employed by the scanning vehicles. Each model has its own benefits and limitations. One approach, known as the Random Model, places scanning devices in vehicles as they are conducting daily activities for business or personal use. These vehicles could be delivery trucks, taxi cabs, traveling salesman or just hobbyists. The concept is that over time these vehicles will cover enough streets in their own random fashion in order to build a reliable reference database. The model does in fact provide a simple means to collect data but the quality of the resulting data is negatively affected due to issues of "arterial bias". FIG. 3 describes the challenge of the random model. When scanning vehicles traverse routes designed to solve other problems than gathering data (e.g. delivering packages, people commuting to and from work) they tend to follow destination routes. A destination route is when a driver needs to get from A to B and seeks the fastest route to get there. So the driver looks for the shortest route to the nearest main artery whether it be a highway or a main thoroughfare. As a result, over time the random driving covers more and more ground by the cumulative coverage shows a bias to the main roads, or arteries at the expense of the smaller and surrounding roads. In FIG. 3, arteries [304] and [305] are heavily traversed by the scanning vehicles resulting in a healthy amount of scanning data for those streets. But streets [306] and [307] are rarely, if ever, covered because there is no frequent destination on those streets and the arteries are more optimal travel roads. The result is that access points [308] and [309] are not scanned at all by the scanning vehicles so the positioning system will struggle to identify a user who is traveling on streets [306] and [307]. The result is that when the system attempts to calculate the location of the access point from the scan data it is limited to a biased collection of input data. FIG. 11 shows the difference in resulting data quality. As the scanning vehicle drives near the Access Point [1101], it records a reading and its location continuously. The positioning system must then calculate the location of the Access Point [1102] using the entire set of observed data [1103]. In the Random Scanning model the set of data is limited to one main road passing by the access point. That forces the system to calculate the access point's location near that road rather than close to the access point itself.

Another approach is develop routing algorithms that include every single street in the target area so as to avoid arterial bias in the resulting collection of data thus producing a more reliable positioning system for the end users. FIG. 4 describes an optimized routing algorithm known as the Chinese Postman to calculate the most efficient driving route for covering every single street in a target area. The Chinese Postman routing algorithm is a known technique used by postal agencies, utilities and census agencies and is a variant of the Eulerian cycle problem. The Eulerian cycle is a problem asking for the shortest tour of a graph which visits each edge at least once. (See, e.g., Kwan, M. K. "Graphic Programming Using Odd or Even Points." *Chinese Math.* 1, 273-277, 1962.) Preferred embodiments of the invention include a methodology for identifying a target region for coverage and then using the Chinese Postman routing algorithm for planning the vehicle route. The scanning vehicle follows the optimal route according to the algorithm showing no bias to any street ensuring that all observable access points are detected and mapped by the system. So, by way of example, access points [408] and [409] are added to the access point database using the Chinese Postman model but would have been missed using the Random model. Referring back to FIG. 11, with the Chinese Postman Scanning model, the vehicle travels every single road getting as complete a set of scanning records [1106] for the Access Point [1104]. The system can then calculate the location [1105] of the access point with less error since it has a more uniform distribution of scan data for access point 1104 than for access 1102. So the Chinese Postman Scanning model not only gathers more access points uniformly across a target area but the resulting data produces more accurate calculations of access point locations.

Higher Quality AP Locations

Once collected (or partially collected), the scanning data is uploaded back to a central access point database (described later in this application) where it is processed. The raw observation points for each access point are used to reverse triangulate the actual physical location of the access points or create a power profile representing the radio propagation of that access point. In order to produce the most accurate calculated location for a particular access points or to create the most accurate power profile, the scanning vehicle must observe the access point from as many different angles as possible. In the random model [FIG. 3], many access points are observed from only one street forcing the system to calculate their location directly on the street [303]. These locations exhibit a directional bias and are significantly different than the actual locations of these access points [302]. Errors are introduced into a positioning system when its reference point locations are inaccurate. So in this positioning system, the accuracy of the access point locations play a large role in the accuracy of the end user positioning accuracy. Using the Chinese Postman model [FIG. 4] the scanning vehicles detect a particular access point from as many sides as possible of the building housing the access point. This additional data greatly improves the results of the reverse triangulation formula used to calculate the location of the access points [403]. More details on the access point location quality is described in connection with FIG. 11.

The scanning data collected from this system represents a reliable proxy for the signal propagation pattern for each access point in its specific environment. Every radio device and associated surrounding environment produces a unique signal fingerprint showing how far the signal reaches and how strong the signal is in various locations within the signal fingerprint. This fingerprint data is used in conjunction with the calculated access point location to drive high accuracy for the positioning system. This fingerprint is also known as a "power profile" since the signal strengths at each position is measured as signal power in watts. The positioning system can interpret the fingerprint data to indicate that a particular signal strength of an 802.11 access point radio is associated with a particular distance from that access point. Signal fingerprinting techniques are used in indoor Wi-Fi positioning but have proved difficult to replicate in the wider area outdoor environments because the difficulty associated with collecting the fingerprint data. When the fingerprints or power profiles of multiple access points are overlayed, the positioning system can determine a device location merely by finding the one position where the observed signal strengths match the combined fingerprints. Preferred embodiments of this invention provide a reliable system for obtaining this fingerprint data across a massive coverage area with millions of access points in order to utilize fingerprint-based positioning algorithms.

Reference Symmetry

Positioning systems typically work by having three or more reference points around the device being tracked. These positioning systems use the radio signals from these reference points in various ways to calculate the device's current location. Significant errors occur when there are an insufficient number of reference points or when the reference points lack balance or symmetry around the user. As illustrated in FIG. 5, the arterial bias that emerges from the random model introduces many scenarios where the end user [501] moves into physical areas in which there are only recorded access point locations [502] on one side of them. This lack of symmetry in the distribution of reference points around the end user causes the positioning algorithms to calculate the device location [503] with a great deal of error. With Chinese Postman model of scanning for access points, the user typically encounters a physical location [FIG. 6] in which there are numerous access point locations [602] on all sides of the user [601] within the range [604] of the device's 802.11 radio. The resulting position calculation [603] has reduced location bias and is more accurate as a result. FIG. 11 is another example showing the impact of quality location calculations.

Scanning Device

FIG. 7 depicts the details of a preferred embodiment of a scanning device 702 used to detect and identify the various Wi-Fi access points. A scanning vehicle [701] contains a scanning device [702] that continuously scans the airways for radio signals from GPS satellites [708] and 802.11 access points [707]. The scanning device runs the scanning client software [704] that controls the entire process. The scanning client activates both the GPS receiver [705] and the 802.11 radio [706]. The GPS receiver is set into a continuous reception mode calculating the geographic location of the device every second. That calculation is read by the scanning client and stored in the local data storage [703]. The scanning client initiates the 802.11 radio and begins sending out 802.11 probe requests using directional antennas [709]. Any 802.11 access point [707] within range of that probe request responds with a signal beacon as per the 802.11 protocol. The responding signal beacons contains the network name of the access point (known as an SSID), the MAC address of the access point device as well as other meta information about the access point. The responding signals reach each of the directional antennas with a different strength of signal based on the vector of origin and the proximity of the access point. That vector is recorded along with the identifier of that particular antenna and the meta information about the access point. This probe-receive-record process occurs continuously every tenth of a second. The scanning device deployed is a combination of the iPAQ 4155 Pocket PC and Powered GPS PDA Mount Cradle with integrated SiRF II type GPS receiver with XTrac v. 2.0 firmware.

The Scanning Client 704 of certain embodiments is described in connection with FIG. 10. The client consist of three main components, the Data Manager [1001], the System Manager [1002] and the Upload Manager [1003]. The Data Manager [1001] controls the operations of both the GPS radio [1006] and the 802.11 radio [1007]. The Data Manager controls when and how often these radios scan for signals and process those signals. The GPS radio once activated receives signals from GPS satellites [1004] and calculates its geographic location. The GPS recorder [1008] logs all of those readings every second and sends them to the File Manager [1010]. The Wi-Fi Recorder [1009] activates the 802.11 Radio to scan every tenth of a second, and associates those 802.11 readings with the GPS readings coming from the GPS radio and sends the resulting data to the File Manager. The File Manager receives scan data from both the GPS Recorder and Wi-Fi Recorder and creates storage files on the device. This process continues the entire time the device is operational and both radios are functioning In the Upload Manager [1003] there is a Hotspot Detector [1017] that monitors the 802.11 scanning results to look for the configured network of public hotspots [1024] (e.g. T-mobile) that the device is authorized to access. Once it detects a valid Hotspot it notifies the user of its presence. The user can select to connect to the hotspot by activating the Create Connection component [1018]. This component associates with the hotspot's access point and creates an 802.11 connection. Then the Hotspot Authentication module [1019] supplies valid authentication information for the device. The hotspot validates the account and then provides network access to the device. The Upload Manager then initiates the Upload Server Authentication process [1020] to connect to the Central Network Server [1025] and provides valid authentication information. Once authenticated, the Upload & Data Verification module [1021] is initiated. This module retrieves the scan data from the Scanning Data store [1011] and uploads the data to the Central Network Server using FTP. The Central Network Server initiates a process to store all the data in the Central Access Point Database. After the upload is complete the upload process moves the scan data from the Scanning Data store [1011] to the Backup Data store [1012] on the device. Once the upload is completed and verified, the New Version module [1022] checks the Central Network Server to determine if there is a new version of the client software available for the device. If there is a new version, the software is downloaded and the New Version Installation [1023] process begins to upgrade the client software. Once the installation process is completed the connection with the Central Network Server is terminated, the connection with the hotspot is terminated and the device returns to normal scanning operation.

Included in the Scanning Client 704 are a set of utilities that help to manage the device and reduce system errors. The Radio Manager [1013] monitors the operation of the GPS Radio and the Wi-Fi Radio to make sure they are functioning properly. If the Radio Manager encounters a problem with one of the radios, it will restart the radio. The User Interface Controller [1014] presents the tools and updates to the user so they can operate the device effectively. The Error Handling and Logging [1015] records all system issues to the device and alerts the user so they can address. The System Restart module [1016] is called when issues cannot be resolved. This module shuts down the device and restarts the hardware, operating system and scanning client to ensure proper operation.

The ⅟10 of a second 802.11 scanning interval was chosen since it provides the optimal scanning period for 802.11 under these conditions using off the shelf hardware. 802.11b/g/n operates using 14 channels of the unlicensed spectrum. An individual access point broadcasts its signal beacon over one of those channels at any given time. The scanning device needs to survey each channel in order to observe as many access points as possible. The scanning interval is correlated with the average speed of the scanning vehicle to optimize how the scanning client covers the frequency real estate of a particular region.

Central Network Server

With reference to FIG. 8, the fleet of vehicles perform their scanning routines while driving their pre-designed routes. Periodically each vehicle [801] will connect to an available 802.11 access point and authenticate with the Data Communications Module [807] of the Central Network Server. Typically the access points used for communicating with the Central Network Server are public hotspots like those operated by T-Mobile ensuring reliable and metered access. The provisioning of this connection could be done via any available public access point. The scanning vehicle stops at a nearby hotspot location and begins the process of connecting to the access point. Once authenticated, the scanning client [704] identifies all the recently collected scan data from the local storage [703] and uploads that data to the Central Network Database [802].

Once the data has been uploaded to the database, the Parser and Filter process [803] begins. The Parser and Filter process reads all of the upload scanning data and loads it up into the appropriate tables of the database. During this exercise the data is evaluated for quality issues. In some cases the GPS receiver may record erroneous or error records for some period of time, which could negatively affect the final access point location calculation. The parser and filter process identifies these bad records and either corrects them or removes them from the system. The filtering process users clustering techniques to weed out error prone GPS readings. For example, if 90% of the readings are within 200 meters of each other but the remaining 10% of the readings are 5 kilometers away then those outliers are removed by the filter and stored in a corrupted table of the database for further analysis. In particular, the system first calculates the weighted centroid for the access point using all reported data. It then determines the standard deviation based on the distribution of the reported locations. The system uses a definable threshold based on the sigma of this distribution to filter out access points that are in error. Once these error records are marked, the centroid is recalculated with the remaining location records to determine the final centroid using the Reverse Triangulation method described below.

Note that the error records may be the result of an access point that has moved. In this instance, the centroid for the access points will quickly "snap" to the new location based on the preponderance of records. An additional enhancement to the algorithm would include a weighting value based on the age of the records such that new records represent a more significant indication of the present location for a given access point.

Once the parsing process has been completed the central network system initiates the Reverse Triangulation model [804] begins processing the new data. During this process 1) new access points are added to the database and their physical location is calculated and 2) existing access points are repositioned based on any new data recorded by the scanners. The reverse triangulation algorithm factors in the number of records and their associated signal strengths to weight stronger signal readings more than weaker signals with a quasi weighted average model.

During data gathering, a WPS user is equipped with a Wi-Fi receiver device which measures Received Signal Strength (RSS) from all the available Wi-Fi access points, and then extracts location information of corresponding access points. RSS value of access points are shown as follows:

$$\{RSS_1, RSS_2, \ldots RSS_n\}$$

If the corresponding recorded GPS location of access point i is denoted by $\{Lat_i, Long_i\}$, and the calculated access point location is denoted by $\{Lat_i, Long_i\}$, the triangulated position is found by applying the algorithm as follows:

$$Lat_u = \frac{\sum_{i=1}^{n} \sqrt[4]{10^{RSS_i/10}} \, Lat_i}{\sum_{i=1}^{n} \sqrt[4]{10^{RSS_i/10}}}$$

$$Long_u = \frac{\sum_{i=1}^{n} \sqrt[4]{10^{RSS_i/10}} \, Long_i}{\sum_{i=1}^{n} \sqrt[4]{10^{RSS_i/10}}}$$

The quad root of power is selected to ease the implementation of the algorithm, since quad root is synonymous to taking two square roots.

The second point is referring to adjusting the dynamic range of coefficients. If the dynamic range of coefficients is a concern, the coefficient of the algorithm can be divided by a constant number, e.g., $$Lat_u = \frac{\sum_{i=1}^{n} \frac{\sqrt[4]{10^{RSS_i/10}}}{C} Lat_i}{\sum_{i=1}^{n} \frac{\sqrt[4]{10^{RSS_i/10}}}{C}}$$

$$Long_u = \frac{\sum_{i=1}^{n} \frac{\sqrt[4]{10^{RSS_i/10}}}{C} Long_i}{\sum_{i=1}^{n} \frac{\sqrt[4]{10^{RSS_i/10}}}{C}}$$

The Parameter C can be any number and it does not impact the results, theoretically. Since, the weighted average is based on the ratio of the coefficients and not the absolute value, theoretically, dividing all the coefficients by a constant value, C, does not impact the results, but it changes the dynamic range of the coefficient values.

This final $\{Lat_i, Long_i\}$ is then used as the final centroid value for the location of that access point. The latitude and longitude will then be stored in the database including a timestamp to indicate the freshness of the triangulation calculation.

After the Central Network Database has been updated and each access point has been repositioned, the Data Pack Builder [805] creates subsets of the database based on regions of the country or world. The pack builder facilitates distribution of the database for a variety of use cases in which only region certain geographies are of interest. The pack builder is configured with region coordinates representing countries, time zones and metropolitan areas. Utilizing this technique a user can download just the location data for the west coast of the United States. The pack builder segments the data records and then compresses them.

The Fleet Management Module [806] helps operations personnel manage the scanning vehicles and ensure they are adhering the routing procedures. This module processes all the scan data and builds the location track for each vehicle in the system. The operations manager can create maps of the vehicle track using the Map Builder [808] to visually inspect the coverage for a particular region. The GPS tracking data from each device is reviewed with route mapping software to verify completion of coverage and to identify missed areas. This ability to audit and verify uniform coverage ensures that the system is getting the best data possible. The module also calculates the driving time of the vehicle to determine average speed and to subtract any idle time. These outputs are used to monitor efficiency of the overall system and in planning of future coverage.

It will be appreciated that the scope of the present invention is not limited to the above described embodiments, but rather is defined by the appended claims; and that these claims will encompass modifications of and improvements to what has been described.

What is claimed is:

1. A method of locating a user-device having a Wi-Fi radio, comprising:
   providing a reference database of Wi-Fi access point information about Wi-Fi access points in a target area;
   in response to a user application request to determine a location of a user-device having a Wi-Fi radio, receiving messages from Wi-Fi access points within range of the Wi-Fi device, each message identifying the Wi-Fi access point sending the message;
   determining attributes of the messages received by the Wi-Fi radio;
   accessing the reference database to obtain information about the identified Wi-Fi access points;
   based on the number of Wi-Fi access points identified via received messages, choosing a corresponding location-determination algorithm from a plurality of location-determination algorithms, said chosen algorithm being suited for the number of identified Wi-Fi access points; and
   using the information about the identified Wi-Fi access points and the determined attributes of said received messages and the chosen location-determination algorithm to determine the location of the user-device.

2. The method of claim 1, wherein a first location-determination algorithm of the plurality of location-determination algorithms uses a first set of information about the identified Wi-Fi access points and a second location-determination algorithm of the plurality of location-determination algorithms uses a second set of information about the identified Wi-Fi access points, the first set of information differing from the second set of information.

3. The method of claim 1 wherein the information about the identified Wi-Fi access points are filtered to determine if the corresponding Wi-Fi access points have moved since the time the information about the Wi-Fi access points was included in the reference database.

4. The method of claim 1 wherein the reference database is located locally relative to the user-device.

5. The method of claim 1 wherein the reference database is located remotely relative to the user-device.

6. The method of claim 1 wherein the location of the user device is provided with latitude and longitude coordinates.

7. The method of claim 1 wherein the plurality of location-determination algorithms includes a simple signal strength weighted average model.

8. The method of claim 1 wherein the plurality of location-determination algorithms includes a nearest neighbor model.

9. The method of claim 1 wherein the plurality of location-determination algorithms includes a triangulation technique.

10. The method of claim 1 wherein the plurality of location-determination algorithms includes an adaptive smoothing technique based on the device velocity.

11. The method of claim 1 wherein the choice of location-determination algorithm is further based on the user application making the location request.

12. The method of claim 1 wherein the information about at least one of the Wi-Fi access points of the reference database includes signal fingerprint information of the Wi-Fi access point, the signal fingerprint information including a plurality of expected signal strength readings of messages transmitted by the Wi-Fi access point at a corresponding plurality of expected locations where the messages are received.

13. The method of claim 12 wherein the plurality of location-determination algorithms includes a technique based on signal fingerprints for more than one Wi-Fi access point.

14. The method of claim 13 wherein the technique includes determining a location by:

calculating the signal strength of messages received by the Wi-Fi radio;

comparing the calculated signal strength with the expected signal strengths of the signal fingerprint information for the more than one Wi-Fi access point to find expected signal strengths that most closely match the calculated signal strength; and determining the location of the user-device based on expected locations that correspond to the expected signal strengths most closely matching the calculated signal strength.

15. The method of claim 1 wherein more than one location-determination algorithm from the plurality of location-determination algorithms is used to determine the location of the user-device.

* * * * *